Aug. 29, 1967  H. J. NELSON  3,338,123
SHEET CUTTING, SORTING AND STACKING APPARATUS
Filed Oct. 6, 1965  5 Sheets-Sheet 1
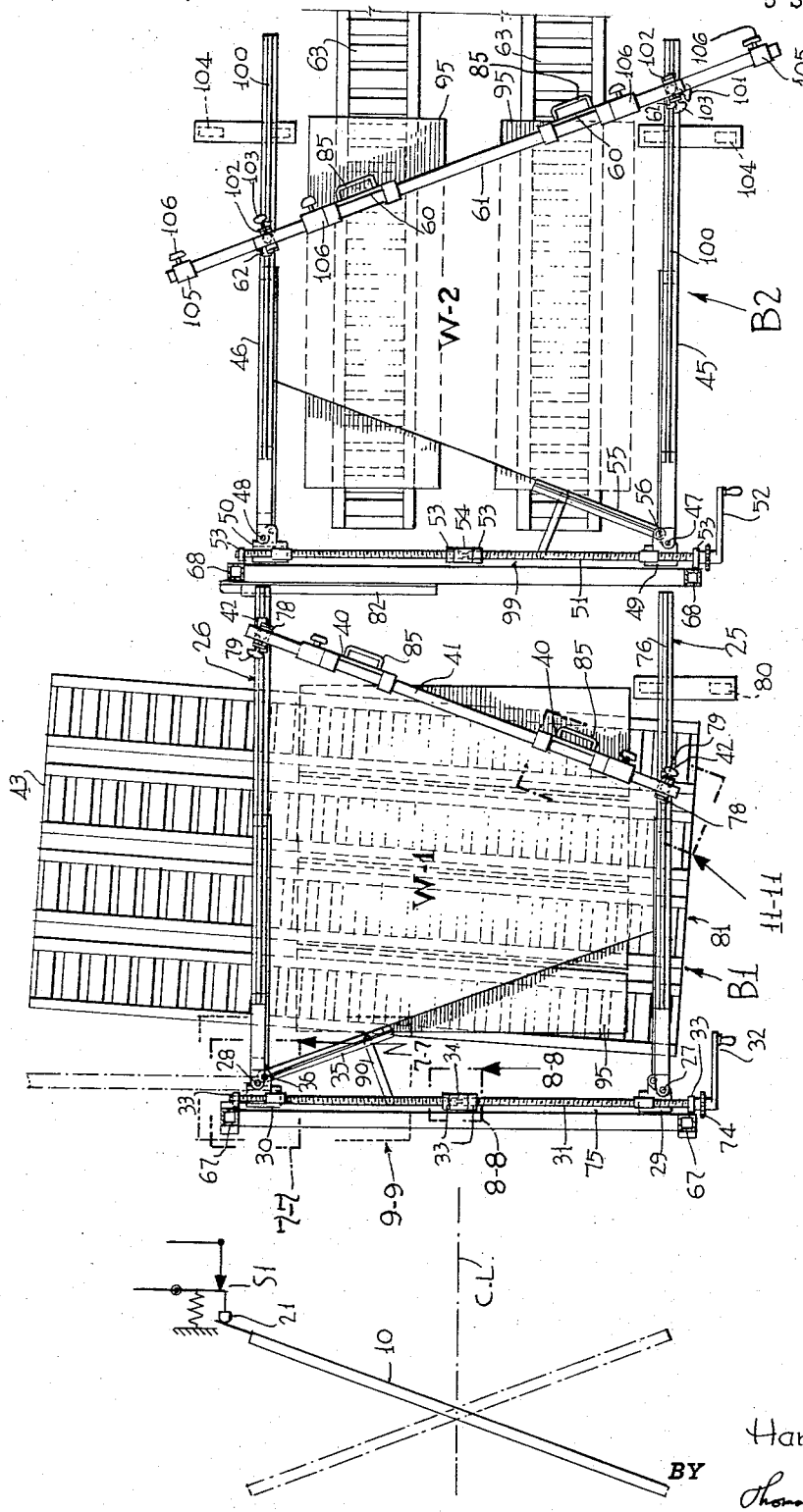
INVENTOR.
Harvey J. Nelson
BY
ATTORNEY

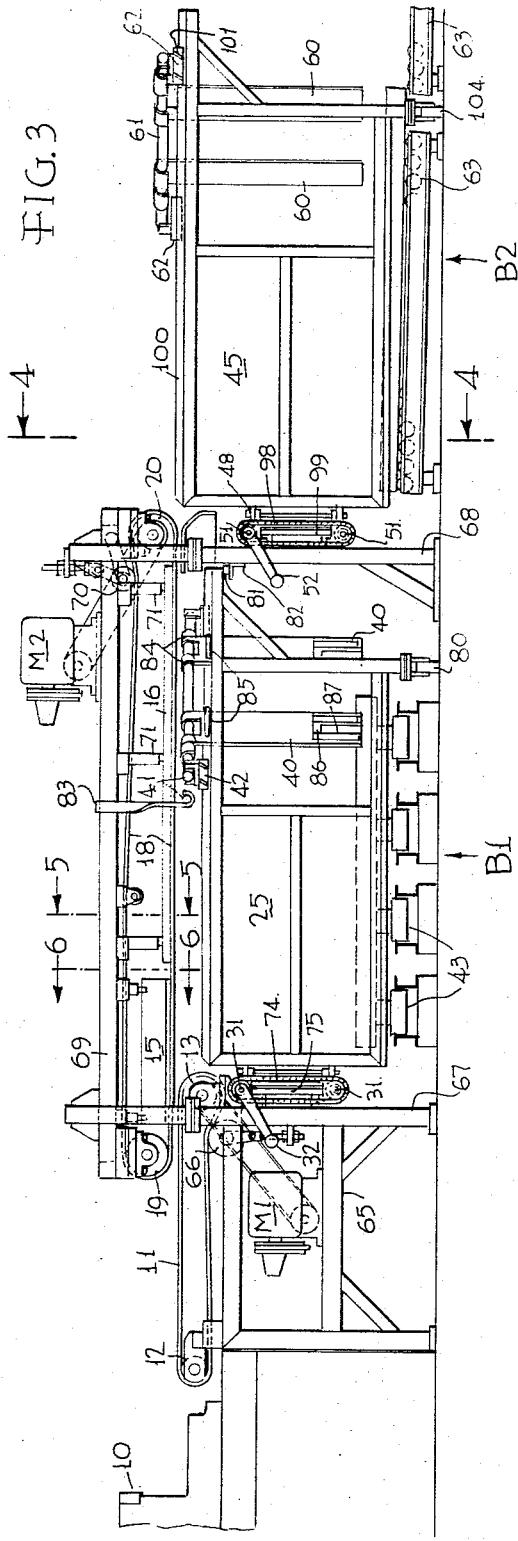

INVENTOR.
Harvey J. Nelson
BY
ATTORNEY

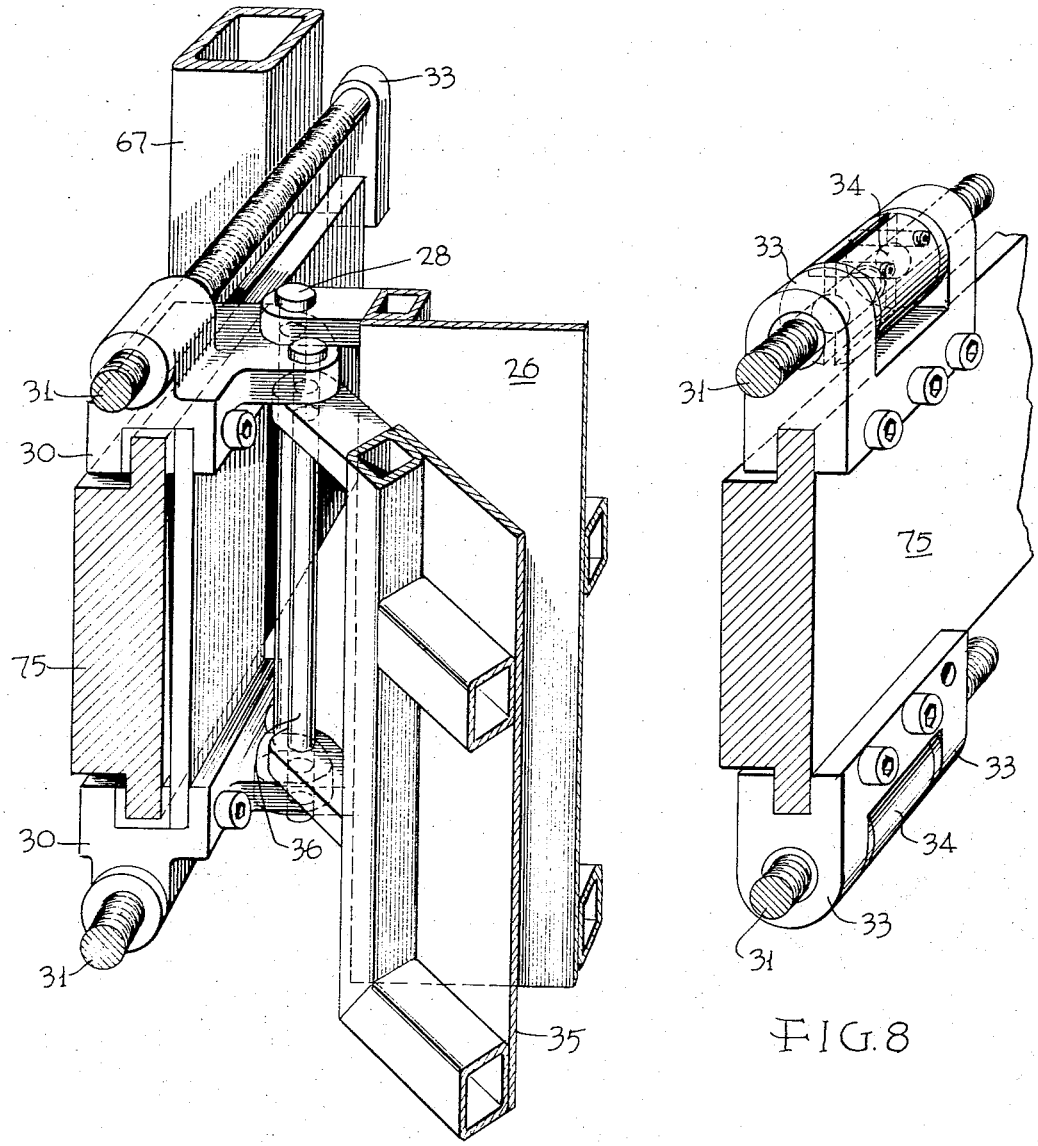

Aug. 29, 1967  H. J. NELSON  3,338,123
SHEET CUTTING, SORTING AND STACKING APPARATUS
Filed Oct. 6, 1965  5 Sheets-Sheet 5
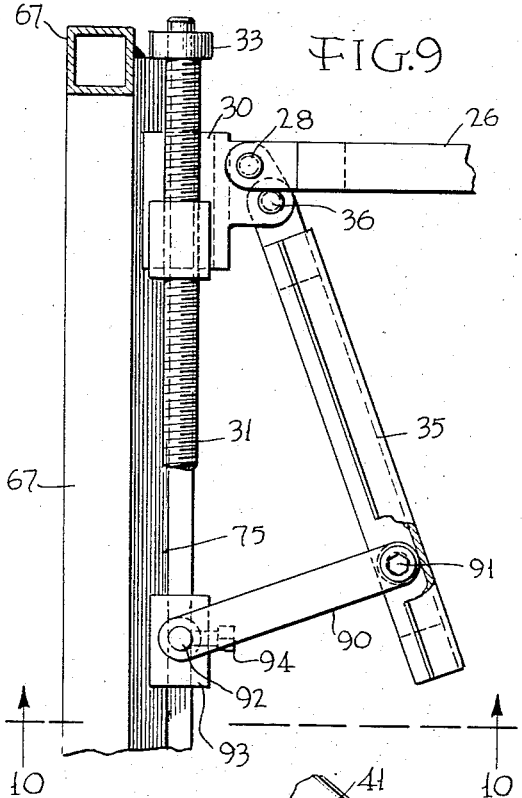
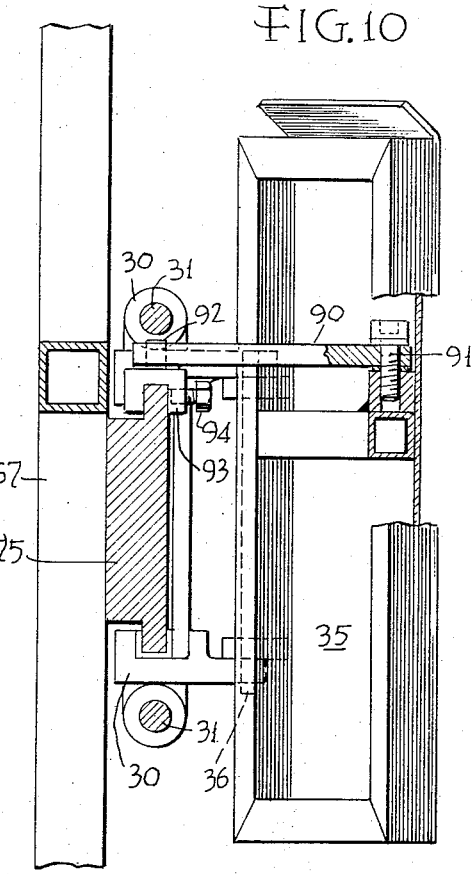
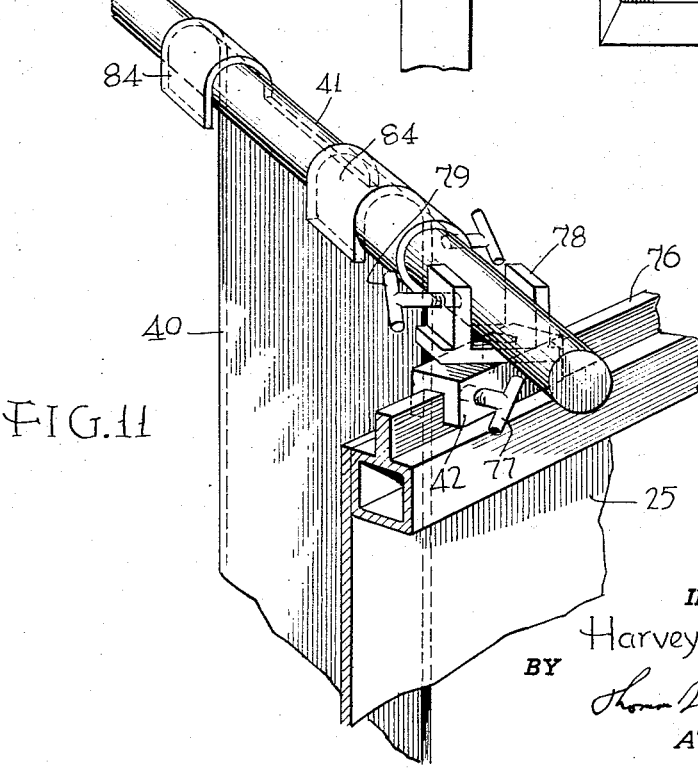
INVENTOR.
Harvey J. Nelson
BY
ATTORNEY

United States Patent Office 3,338,123
Patented Aug. 29, 1967

3,338,123
SHEET CUTTING, SORTING AND
STACKING APPARATUS
Harvey J. Nelson, Warren, Mich., assignor to The
Budd Company, Philadelphia, Pa., a corporation of
Pennsylvania
Filed Oct. 6, 1965, Ser. No. 493,498
7 Claims. (Cl. 83—79)

ABSTRACT OF THE DISCLOSURE

A sheet processing apparatus for cutting alternating opposed trapezoidal blanks from strip material and providing a selective conveyor for sorting and stacking the blanks in piles of similarly orientated dispositions.

This invention relates to sheet processing apparatus, specifically to sheet cutting, sorting and stacking apparatus for angularly cut magnetic metal sheets, and has for an object the provision of improvements in this art.

In certain fields, such as the automobile body manufacturing field, it is often desirable and economical to use cut sheet metal blanks of trapezoidal shape, that is, a truncated triangular shape, and these blanks may be cut from a continuous sheet by press shears having angular shear blade movements so as to make alternate cuts at opposite angles. The side edges of a cut blank are parallel and the angular end edges are usually symmetrical, that is, they make equal but opposite angles relative to the parallel sides of the blank.

Oscillatory cut-off press shears are well known and will be referred to herein only as providing oppositely disposed trapezoidal blanks from a continuous sheet. After such oppositely disposed trapezoidal blanks have been cut it is desirable to have all blanks of one disposition stacked in one pile and all blanks of the other disposition stacked in another pile.

It is, therefore, one of the specific objects of the invention to provide means correlated with the angular position of the shears for sorting the cut blanks and for conveying and stacking them in different piles.

Another object is to control the selection of the pile to which a blank is fed by the passage of a blank.

Another object is to provide improved pile holding and aligning means.

Another object is to provide pile holding means which furnishes quick and convenient means for removing a pile of blanks from the stacking guides.

Another object is to provide simple and convenient means for adjusting the stack holding and aligning means for different widths, lengths and end angles of blanks.

The above and other objects of the invention, as well as various features of novelty and advantages, will be apparent from the following description of an exemplary embodiment, reference being made to the accompanying drawings, wherein:

FIG. 1 is a plan view to show the general action of the apparatus;

FIG. 2 is a diagrammatic elevational view and schematic wiring diagram of the apparatus;

FIG. 3 is a right side elevation of the conveying and stacking apparatus;

FIG. 7 is a partial enlarged perspective view showing a guide plate holding bar support, the view being taken in the zone 7—7 of FIG. 1;

FIG. 8 is a partial enlarged perspective view taken in the zone 8—8 of FIG. 1;

FIG. 9 is a partial enlarged plan view taken in the zone 9—9 of FIG. 1;

FIG. 10 is a vertical longitudinal section and elevation taken on the line 10—10 of FIG. 9;

FIG. 11 is a partial enlarged perspective view taken in the zone 11—11 of FIG. 1.

Figure 4:
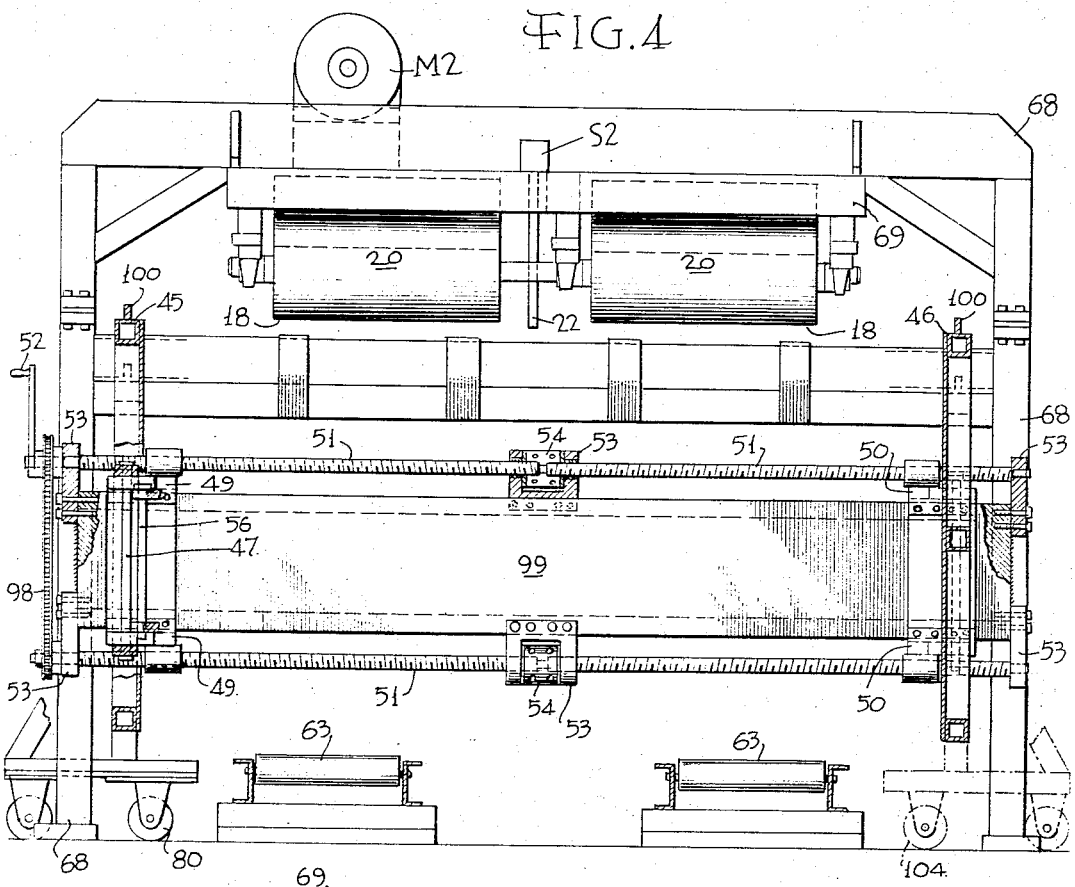
FIG. 4 is an enlarged transverse vertical section taken on the line 4—4 of FIG. 3.
Figure 5:
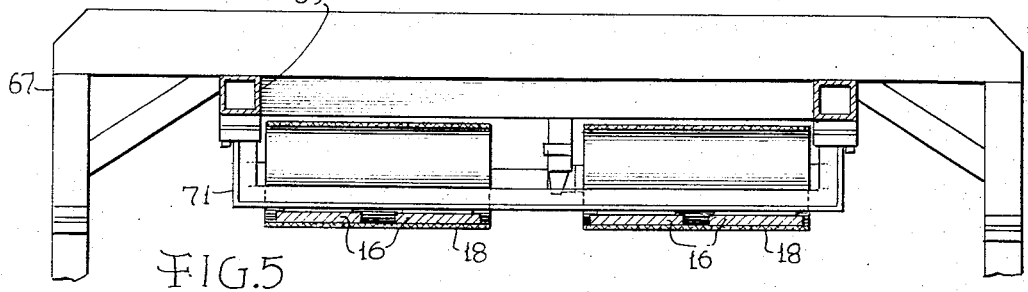
FIG. 5 is a partial enlarged transverse vertical section taken on the line 5—5 of FIG. 3.
Figure 6:
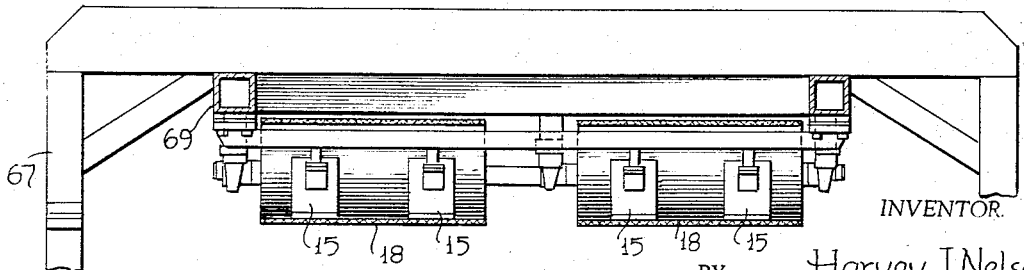
FIG. 6 is a partial enlarged transverse vertical section taken on the line 6—6 of FIG. 3.

The general organization of the apparatus and its mode of operation can be understood by reference to FIGS. 1 and 2. The oscillatory blades of the press shears are designated by the numeral 10. These press shears are well known and in common use so that no detailed illustration is needed for an understanding of their relationship to the present invention. It is sufficient to know that after each cut from a continuous sheet which is fed to the shears the blades oscillate to an opposite angular position to make the next cut, after which the blades shift back to the first position. By this action the shears form trapezoidal or truncated triangular blanks W1 and W2 of opposite disposition, as shown in FIG. 1. The shear blades turn about a vertical axis lying in a longitudinal center line C.L. and the blanks move out along this center line.

Since alternate blanks have alternate disposition or orientation, one with the long edge on one side and the other with the long edge on the other side of the center line, it is arranged that blanks W1 will be deposited on a pile or stack in a first bin B1 and the blanks W2 will be deposited in a second bin B2.

As shown in FIG. 2, all blanks are fed out from the press shears on an endless conveyor belt 11 operating on drive drums 12 and 13. If desired, magnetic means may be positioned beneath the top span of the belt to hold the blanks down. If no other influence is applied to the blanks they will fall into bin B1. All blanks W1 do fall into bin B1 when the blank sorting means is in action.

In order to cause the other blanks W2 to travel past bin B1 and fall into bin B2 it is arranged that they be restrained from falling as they approach bin B1. Since the blanks here being considered are of steel sheet they can conveniently be held in elevated position by magnetic means. Accordingly, there is a first, or what may be called a switching set of magnets 15, which can be energized or de-energized under circuit control; and a second set of magnets 16 which can either remain energized at all times or be energized when a blank is passing. Since strong permanent magnets are available at relatively low cost and since it is simpler and more convenient to use permanent magnets here, such permanent magnets are symbolically indicated by the conventional horseshoe shape although this is not necessarily the actual form used, as will be seen.

A conveyor belt 18, mounted on drive drums 19 and 20, has its lower span travelling outward to carry blanks which are held upward by the magnets to the bin B2.

The swiching magnets 15 are controlled conjointly by the shears and by a blank which passes the first bin. As shown in FIG. 1, a biased-open switch S1 has an operating element 21 located where it will be closed when the shear blades are in one angular position. This switch is shown in circuit in FIG. 2. It is arranged in the circuit of power lines L1 and L2 so as to energize a delay-on relay R through a bias-closed switch S2 which is opened by the passage of a blank carried by the belt 18 when the blank strikes the operating element 22 of the switch. When the relay R is energized it closes a lock-in switch R1 and a power switch R2 which applies current from the power lines L3 and L4 to the switching magnets 15. The switch S1 opens after the relay R closes its contacts and after the shear blades swing away from the switch operating position, the switch S2 keeping the relay R and the magnets 15 energized until a passing blank opens switch S2 to de-energize the relay and magnets. The other magnets 16 remain energized to cause the blank to complete its travel to bin B2. The time delay in energizing relay R is provided to prevent the magnets 15 from attracting the trailing end of a blank W1 which is entering bin B1.

The bins have side guides or gates which are adjustable coordinately but oppositely in a transverse direction to take blanks of different widths and they have end guides or stops which are adjustable for different lengths and angularities of blanks. At bin B1 there are side guides or gates 25 and 26 which are hinged at 27 and 28 to laterally adjustable supporting blocks 29 and 30 which are moved in and out on suitable guide supports by an oppositely threaded shaft 31 operated, as by a crank or handle 32. As will be seen, there are upper and lower blocks 29, 30 and adjusting shafts 31 but it is sufficient for the diagram to show one set of adjusting means. The shaft rotates in bearings 33, collars 34 preventing axial displacement at some or all of the bearings.

The sheets are aligned in a pile or stack in the bin by guide means which can be adjusted to fit different angles of cut. On the incoming or rear end of the bin on the long side of the blank, there is a rear end guide 35 which is hinged at 36 on the shiftable block 30 which carries the hinged side 26. Suitable means are provided to hold the guide 35 in adjusted angular positions.

On the outgoing or front end of the stack in bin B1 there are guide means in the form of bottom-weighted suspended guide plates 40 carried on a transverse bar 41 which is adjustably mounted on rails on the upper edges of the side guides or gates 25, 26, as on turnable heads carried on slides 42 which can be locked in position and which provide means for locking the bar in position to fit any angle of the blank.

Roller conveyors 43 provide means for moving the stacks out of the bin B1 to a point where they can be removed. They may be strapped as a bundle or taken away on pallets. The conveyors in plan are inclined slightly forwardly in the direction of blank travel away from the bin to prevent binding in case square cut blanks are stacked in the bin. In case square cuts are made or if for some other reason it is desired to dispense with the automatic selection of alternate bins and use one bin at a time, the circuit from lines L1, L2 is de-energized, as by a switch S3, and the circuit of lines L3, L4 is placed under the control of a hand switch S4 which can keep the switch magnets 15 either energized or de-energized to feed blanks either to bin B2 or B1, as desired.

Bin B2 has stack guides which are almost the same as those for bin B1. There are sides or gates 45, 46 hinged at 47, 48, on blocks 49, 50, respectively, a shifting shaft 51 with a crank 52, bearings 53 and collars 54.

There is an incoming or rear end guide 55 hinged at 56 on the block 49, but here the guide is located on the other side, near the gate 45, because the long end of the blank fed to bin B2 is on that side.

On the outgoing or front end there are suspended guide plates 60 carried on a transverse bar 61 which is mounted on turnable heads carried on slides 62 on the tops of the side guides or gates 45, 46.

Roller conveyors 63 are provided for removing the stacks. The roller conveyors could be located on the side, as for bin B1, but in this case are preferably located at the outer end of the bin B2.

The foregoing description of parts shown diagrammatically in FIGS. 1 and 2 discloses the general arrangement of the apparatus; the actual physical form of the apparatus is shown in the remaining figures.

A frame 65 carries the feed-off conveyor belt 11, the belt being driven by a motor M1 and the lower span of the belt having its tension adjusted by an idler drum 66. It is not necessary to explain the drive mechanism and drum adjusting mechanism in detail since these are well known and not specifically related to the present invention.

The forward end of the frame 65 includes upstanding supports 67 located at the rear end of the first bin B1 and a similar upstanding support structure 68 is located at the front end of the first bin B1, this also being the rear end of the second bin B2.

A top or bridge frame 69 is mounted on the supports 67 and 68. It carries the magnet-backed conveyor belt 18 and its drums 19, 20 and the drive means therefor. It will be noted that there are actually two parallel laterally spaced belt with an open space between them on the center line C.L. The operating arm 22 for switch S2 extends down between the belts where it will be engaged by the front end of any sheet blank which passes. The drive for the drums 19, 20 for the belts 18 comprises a motor M2 and suitable intermediate mechanism and the belt is kept in proper tension by an idler drum 70 and suitable adjusting mechanism. The switching magnets 15 are shown in an enclosure; the permanent outer magnets 16 are shown to have the form of elongated parallel bars secured to depending bracket bars 71 carried below the bridge frame 69.

The supports 67 carry the bearings 33 for the screw shafts 31, the handle or crank 32 being carried by the upper screw shaft and the upper shaft driving the lower one through a chain 74 and suitable sprockets on the shafts.

The front of the supports 67 also carries a vertically deep transverse guide bar 75 between the screw shafts 31; and the mounting blocks 29, 30 are slidably mounted on the upper and lower edges, respectively, of the guide bar.

The side guides or gates 25, 26 have rails 76 on which the slides 42 for the bar 41 are supported. The slides are locked in position by hand clamps, such as screws 77. Each slide 42 supports an open-top U-shaped head 78 which is turnable about a vertical pivot pin and the bar is releasably secured in the head by a hand clamp screw 79.

The gate 25 on the side away from the roller conveyors 43 where the floor is unobstructed is provided at its front end on the bottom with caster rollers 80 to support it on the floor when it is swung out. The gate 26 on the other side has its upper edge extended and provided with a roller 81 to rest on a bracket rail 82 secured on the upstanding support 68 when the gate is closed.

When either gate 25 or 26 is to be opened the hand clamp screw 79 for the bar on that side is turned back to release the bar and the bar is lifted up and supported by a hook 83 shown in broken lines in FIG. 3, which is provided to hang from the bridge frame above. Collars or other suitable indicia or stops may be provided on the bar to assure that the gate is returned to proper position when closed.

The swinging guide plates 40 hang by hooks 84 from the bar 41 and each guide plate is provided with a handle 85 by which it may be lifted from the bar. On the outer side each guide plate 40 is provided with a pocket 86 to receive weights 87 to control its action. When a sheet falls in the bin it first pushes the hanging guide plate back but on rebound the plate strikes the sheet and pushes it back against the opposite end guide 35 and in end alignment with the other sheets in the stack or pile.

Various means may be provided for holding the rear guide 35 in set angular position, the means shown comprising a rod 90 hinged by a pin 91 at one end to the guide and at its other end hinged by a pin 92 to a sliding block 93 which is movable on the upper edge of the guide 75, the block 93 being secured in adjusted positions, as by a set screw 94.

The guide 35 will have angular movement of, say 0° to 20°, the angle being measured between the guide 35 and a transverse line perpendicular to the center line C.L. A convenient and rapid way to set up the guides is to place a cut blank in the bin, adjust the gates 25 and 26 to fit it on the sides, adjust the guide 35 to fit the angle at the rear end, and adjust the bar 41 until the hanging guide plates 40 fit the front end.

There will be supporting means 95 for the stack on the roller conveyors and suitable chocks (not shown) to prevent the stack from moving down the inclined roller conveyors until it is ready for removal.

When a gate 25 is fully open the tines or arms of a fork lift truck may be run in under the stack to remove it, the spaces between the several runs of the roller conveyors providing room for the tines of the truck between them.

The arrangements for bin B2 are almost the same as for bin B1. There is a chain drive 98 between adjusting shafts 51, 51, a guide bar 99 for the mounting blocks 49, 50, rails 100 on top of the gates 45, 46 for the slides 62 of the bar 61, clamp screws 101 for the slides, a turnable U-shaped bar supporting head 102 with a clamp screw 103 and floor rollers 104 for both gates 45, 46, the spaces on the floor on both sides being clear. The swinging guide plates and the hinged guide adjustment means are the same as for bin B1, except being oppositely disposed, and need no description. The same is the case for the stack supports and chocks.

Since a stack goes out of bin B2 in a forward endwise direction it is not necessary to open the gates very wide and the bar 61 need not be lifted off the gates. It is freed by loosening the set screws and allowed to slide in its supports as the gates are opened and closed. Adjustable stop collars 105 may be provided on the bar 61 to prevent either end from sliding out of its guide and another adjustable collar 106 may be provided to keep the hanging guide plates 60 in proper position.

The operation of the apparatus will be understood from the above description. When a blank W1 with a long side at the left of the center line C.L. is cut, the switching magnet means 15 is de-energized and the blank falls into the first bin B1; when a blank W2 with a long side at the right of the center line is cut the switch S1 is closed to energize the relay R and through its switch R2 to energize the switching magnet means 15, the action being delayed long enough to prevent picking up the trailing end of sheet blank W1 which is passing into bin B1 at this time. The relay locks itself in on its lock switch R1 so as to keep the switching magnet means energized until a sheet passes and is held up by the permanent magnet means 16. When the front end of blank W2 engages the operating arm 22 of switch S2 the relay R is de-energized and with it the switching magnet means 15, thus permitting the next blank W1 to enter bin B1. The blank W2 continues to be held up by the permanent magnet means 16 until it drops off into bin B2. If desired, the location of the operator 22 for the switch S2 may be made shiftable longitudinally to suit the action needed and, if necessary, to accommodate for blanks of different lengths.

The stacks may be strapped as they stand in the bins or may be rolled out for strapping; or they may be moved on pallets or simply picked up by a fork truck and taken for immediate use or other disposition.

If square-ended blanks are cut, the blank sorting means may be made inoperative by the switches S3 and S4 and blanks fed to either bin at will.

It is thus seen that the invention provides simple, convenient and versatile means for cutting, sorting and stacking sheet metal blanks of magnetic material. By other switching and conveying means of similar effect it is possible to handle non-magnetic sheets, the bin and stacking apparatus being suitable and advantageous for handling sheet blanks however they may be fed thereto.

While one embodiment of the invention has been described for purposes of illustration, it is to be understood that there may be various embodiments and modifications within the general scope of the invention.

What is claimed is:

1. Sheet processing apparatus, comprising in combination, sheet cutting means which delivers sheets of two types, switching conveyor means which is actuated when the sheet cutting means delivers a sheet blank of a first type to deliver the blank to a first position, conveyor means for delivering sheet blanks of the other type to a second position when the switching conveyor means is not actuated, and means actuated by a sheet blank in passing to said first position for de-activating said switching conveyor means for delivering a blank to said first position.

2. Sheet processing apparatus, comprising in combination, an angularly shiftable shear means for cutting trapezoidal blanks of alternate disposition, a first conveyor means for conveying all of said blanks away from said shear means, a first bin for receiving a first type of blank from said first conveyor means, a second bin disposed forwardly beyond said first bin, second conveyor means for feeding a second type blank past said first bin and to said second bin, control means energized when said shear means is in an angular position for cutting said second type blank for activating said second conveyor means to carry a blank past said first bin, and control means actuated by a passing blank for de-activating said second conveyor means to cause the following first type blank to be delivered to said first bin.

3. Apparatus as set forth in claim 2, further characterized by the fact that said second conveyor means includes a conveyor belt and magnet means for holding a blank up on said belt, said magnet means including switching magnet means controlled by said shear means and a passing blank and permanent magnet means for carrying the blank after it has passed the switching magnet means.

4. Sheet processing apparatus, comprising in combination, angularly shiftable sheet shear means for cutting alternate trapezoidal blanks of different disposition, conveyor and sorting means for delivering alternate blanks to different positions along a line of travel, a first bin for receiving first type blanks at a first position and a second bin for receiving second type blanks at a second position, each of said bins having side swinging gate guides and means for shifting said gate guides conjointly and oppositely to fit blanks of different widths, angularly adjustable rear guide means for positioning the rear end of blanks, and front guide means mounted on said gate guides for longitudinally and angularly shifting movement for positioning the front ends of said blanks.

5. Sheet processing apparatus as set forth in claim 4, further characterized by the fact that a shiftable mounting block is provided for hinge support of said gate guides, said rear guide means being hinged on one of said mounting blocks.

6. Apparatus as set forth in claim 5, in which the rear guide means in the first bin is hinged on a block on one side of the center line and the rear guide means in the second bin is hinged on a block on the other side of the center line.

7. Apparatus as set forth in claim 4, further characterized by the fact that said front guide means comprises a swingable plate, a transverse bar supporting said swingable plate, turnable slide heads supporting said bar, shiftable slides supporting said heads, rails on the tops of said gate guides supporting said slides, means for releasably securing said bar in said heads, and means for releasably securing said slides at different poistions along said rails.

References Cited

UNITED STATES PATENTS

| | | | |
|---|---|---|---|
| 2,307,594 | 1/1943 | Lee | 83—32 X |
| 3,077,803 | 2/1963 | Hasselquist | 83—31 |
| 3,212,380 | 10/1965 | Gobel et al. | 83—559 X |
| 3,267,782 | 8/1966 | Benzing | 83—89 X |

WILLIAM W. DYER, Jr., *Primary Examiner.*

JAMES M. MEISTER, *Examiner.*